US008250524B2

(12) United States Patent
Barnett et al.

(10) Patent No.: US 8,250,524 B2
(45) Date of Patent: Aug. 21, 2012

(54) CONTRACT PROGRAMMING FOR CODE ERROR REDUCTION

(75) Inventors: Michael Barnett, Seattle, WA (US); Manuel A. Fahndrich, Seattle, WA (US); Brian M. Grunkemeyer, Redmond, WA (US); Wolfram Schulte, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1076 days.

(21) Appl. No.: 11/963,346

(22) Filed: Dec. 21, 2007

(65) Prior Publication Data

US 2009/0164973 A1 Jun. 25, 2009

(51) Int. Cl.
*G06F 9/44* (2006.01)
(52) U.S. Cl. .................. 717/110; 717/114; 717/140
(58) Field of Classification Search .................. 717/110, 717/123, 140
See application file for complete search history.

(56) References Cited

U.S. PATENT DOCUMENTS

| | | | |
|---|---|---|---|
| 6,336,148 B1 | 1/2002 | Doong et al. | |
| 6,442,750 B1 | 8/2002 | Lopes et al. | |
| 6,959,432 B2* | 10/2005 | Crocker | 717/126 |
| 7,039,898 B2 | 5/2006 | Shah | |
| 7,065,745 B2* | 6/2006 | Chan | 717/117 |
| 7,168,063 B2 | 1/2007 | Meijer | |
| 7,216,338 B2 | 5/2007 | Barnett et al. | |
| 7,346,897 B2* | 3/2008 | Vargas | 717/137 |
| 7,367,015 B2* | 4/2008 | Evans et al. | 717/110 |
| 7,421,680 B2* | 9/2008 | DeLine et al. | 717/114 |
| 7,526,755 B2* | 4/2009 | DeLine et al. | 717/114 |
| 7,555,757 B2* | 6/2009 | Smith et al. | 719/328 |
| 7,574,692 B2* | 8/2009 | Herscu | 717/116 |
| 7,707,547 B2* | 4/2010 | Colton et al. | 717/118 |
| 7,844,958 B2* | 11/2010 | Colton et al. | 717/146 |
| 7,934,207 B2* | 4/2011 | Gustafsson et al. | 717/143 |
| 8,032,860 B2* | 10/2011 | Piehler et al. | 717/110 |
| 8,136,102 B2* | 3/2012 | Papakipos et al. | 717/140 |
| 8,136,104 B2* | 3/2012 | Papakipos et al. | 717/146 |
| 2004/0103405 A1* | 5/2004 | Vargas | 717/137 |
| 2005/0010895 A1 | 1/2005 | Reddappagari | |
| 2005/0028137 A1* | 2/2005 | Evans et al. | 717/110 |
| 2005/0076331 A1 | 4/2005 | Das et al. | |
| 2005/0081192 A1 | 4/2005 | DeLine et al. | |

(Continued)

OTHER PUBLICATIONS

Manuel Fahndrick, Embedded contract language, 2010, ACM, 8 pages, <URL: http://delivery.acm.org/10.1145/1780000/1774531/p2103-fahndrich.pdf>.*

(Continued)

*Primary Examiner* — Thuy Dao
*Assistant Examiner* — Hua Lu
(74) *Attorney, Agent, or Firm* — Workman Nydegger

(57) ABSTRACT

In one embodiment, a computer system provides an application programming interface (API) for augmenting an application API. A computer system receives software code written in a second programming language indicating a user's intention to augment an application API with contracts from a contract API written in a first programming language. The software code includes a reference to the contract API. The contracts include assertions indicating appropriate use of the application API. The computer system accesses portions of the contract API according to the reference in the software code and compiles the received software code and the referenced portions of the contract API into an intermediate language (IL) version of the software code. The IL version is in an intermediate language common to both the first programming language and the second programming language. The IL version includes the assertions indicating appropriate use of the application API.

14 Claims, 5 Drawing Sheets

U.S. PATENT DOCUMENTS

| | | | |
|---|---|---|---|
| 2005/0102656 A1 | 5/2005 | Viehland et al. | |
| 2005/0108682 A1* | 5/2005 | Piehler et al. | 717/110 |
| 2005/0246716 A1* | 11/2005 | Smith et al. | 719/315 |
| 2005/0273764 A1 | 12/2005 | Martin et al. | |
| 2006/0265704 A1* | 11/2006 | Holt | 717/169 |
| 2007/0039010 A1 | 2/2007 | Gadre | |
| 2007/0157169 A1 | 7/2007 | Chen et al. | |
| 2007/0220370 A1* | 9/2007 | Branda et al. | 714/49 |
| 2008/0134160 A1* | 6/2008 | Belapurkar et al. | 717/140 |
| 2008/0216052 A1* | 9/2008 | Hejlsberg et al. | 717/114 |
| 2008/0289026 A1* | 11/2008 | Abzarian et al. | 726/11 |
| 2008/0313613 A1* | 12/2008 | Bierhoff et al. | 717/110 |
| 2009/0055603 A1* | 2/2009 | Holt | 711/154 |
| 2010/0198799 A1* | 8/2010 | Krishnan et al. | 707/702 |
| 2010/0262952 A1* | 10/2010 | Colton et al. | 717/118 |

OTHER PUBLICATIONS

Kathryn Gray, Fine-grained interoperability through mirrors and contracts, 2005, ACM, 15 pages, (URL:http://delivery.acm.org/10.1145/1100000/1094830/p231-gray.pdf>.*

Paul Klint, Toward an engineering discipline for grammarware, 2005, ACM, 50 pages <URL:http://delivery.acm.org/10.1145/1080000/1073000/p331-klint.pdf>.*

Jason Belt, Enhancing spark's contract checking facilities using symbolic execution, 2011, ACM, 14 pages, <URL:http://delivery.acm.org/10.1145/2080000/2070357/p47-belt.pdf>.*

M Barnett, The Spec#programming system: An overview, 2008, Google Scholar, 14 pages, <URL:http://www.springerlink.com/content/0m789xre652nuv06/>.*

W Bohm, Mapping a single assignment programming language to reconfigurable systems, 2002, Google Scholar, 14 pages, <URL:http://www.springerlink.com/content/l7423ww31 2583422/>.*

Wilson, Matthew "Contract Programming 101, The Nuclear Reactor and the Deep Space Probe, Part 1", Jan. 1, 2006, Aritma, Inc., www.aritma.com/cppsource/deepspace.html, 5 pages.

Zee, Karen et al., "Runtime Checking for Program Verification", MIT Computer Science and Artificial Intelligence Laboratory; Cambrige, USA, Mar. 17, 2007, 12 pages.

Barnett, Mike et al., "The Spec# Programming System: An Overview", Microsoft Research, Redmond, WA, USA, Oct. 12, 2004, 21 pages.

Jianjun Zhao et al., "The VeriJava Programming System: An Overview", Dept. of Computer Science and School of Software, Shanghai Jiao Tong University, China, Jul. 11, 2006.

Nam Tran et al., "Managed Assertions for Component Contracts", Society for Design and Process Science, Monash University, Australia, Jun. 2003, 9 pages.

N. Tran et al., "Design and Implementation of Assertions for the Common Language Infrastructure", School of Computer Science and Software Engineering, Monash University, Australia, Jun. 2003, 8 pages.

Anjorin, Anthony "JUnit 4 tutorial", Dec. 31, 2006, Darmstadt, 10 pages.

* cited by examiner

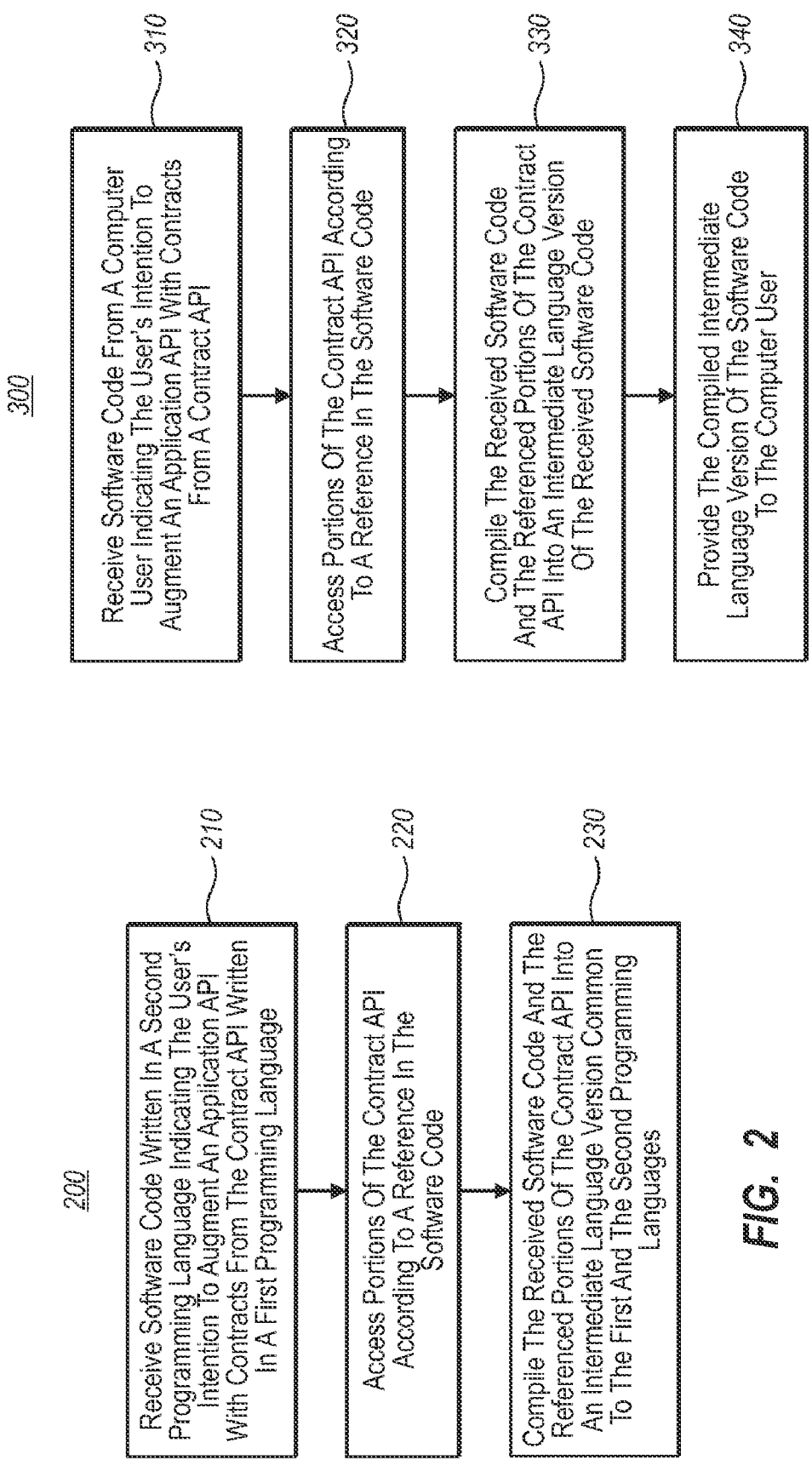

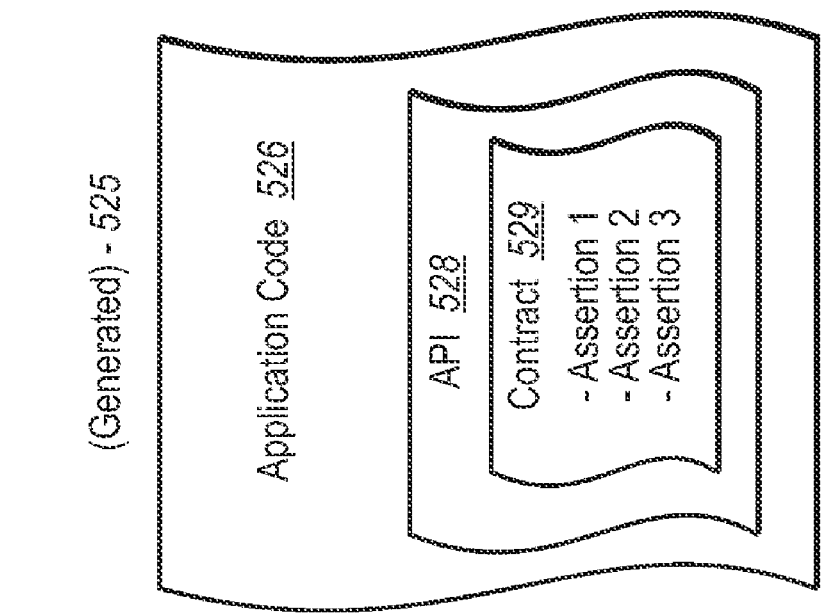
FIG. 5

CONTRACT PROGRAMMING FOR CODE ERROR REDUCTION

BACKGROUND

As computer use has proliferated in today's society, the number of methods and systems for developing software applications to run on these computers has also increased. Software applications may be used to perform a wide variety of tasks based on the design of the application being used. Software applications typically include a number of individual files designed to work together to create some type of desirable end result. In order to write such software applications, software developers typically decide on a programming language to use for that application. Many programming languages are in use today and, as a result, many software applications are written in different languages. These languages are often incompatible with each other, not a few of which use different syntax, different compiling methods and other, different code elements.

To simplify the integration and use of multiple programming languages in their various implementations, managed code has been introduced to provide a platform in which these various applications can interact. Managed code, among other things, allows application developers to specific attributes of a program so that other developers seeking to use some portion of the application will know how best to do so. For example, a developer may specify various elements corresponding to an application variable, a method or an entire process. The developer may, for instance, state in a contract or specification that variable X is to have a certain type, or is to be greater than a certain value. Such application contracts or specifications are often used to reduce the number of errors created in the code before the code is compiled.

Such application contracts, however, are very limited in what they can specify. For example, most application contracts are limited to specifying a variable type. This is useful in eliminating type errors; however, many other errors that may exist would not be prevented by using such a contract.

BRIEF SUMMARY

Embodiments described herein are directed to augmenting an application API. In one embodiment, a computer system provides an application programming interface (API) for augmenting an application API. A computer system receives software code written in a second programming language indicating a user's intention to augment an application API with contracts from a contract API written in a first programming language. The software code includes a reference to the contract API. The contracts include assertions indicating appropriate use of the application API. The computer system accesses portions of the contract API according to the reference in the software code and compiles the received software code and the referenced portions of the contract API into an intermediate language (IL) version of the received software code. The IL version is in an intermediate language common to both the first programming language and the second programming language. The IL version includes the assertions indicating appropriate use of the application API.

In other embodiments, a computer system receives software code from a computer user indicating the user's intention to augment an application API with contracts from a contract API. The software code includes a reference to the contract API. The contracts include assertions indicating appropriate use of the application API. The computer system accesses portions of the contract API according to the reference in the software code, compiles the received software code and the referenced portions of the contract API into an intermediate language version of the received software code including the one or more assertions indicating appropriate use of the application API, and provides the compiled intermediate language version of the software code to the computer user.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which:

FIG. 2 illustrates a flowchart of an example method for augmenting an application API.

FIG. 3 illustrates a flowchart of an alternative example method for augmenting an application API.

FIG. 5 illustrates an exemplary embodiment of a generated contract.

DETAILED DESCRIPTION

Figure 1:
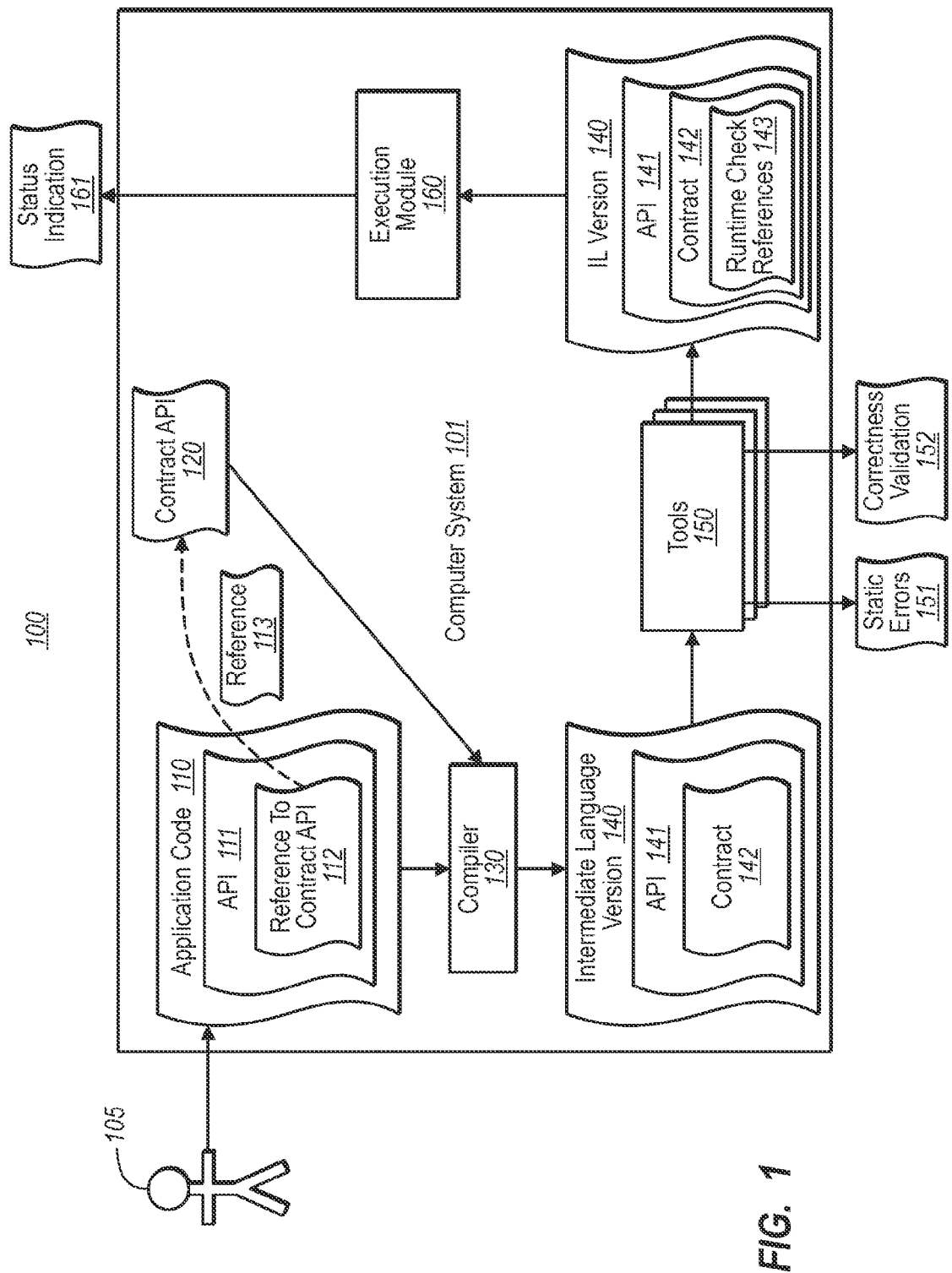
FIG. 1 illustrates a computer architecture in which embodiments of the present invention may operate including modifying and/or generating an API contract.

Embodiments described herein are directed to augmenting an application API. In one embodiment, a computer system provides an application programming interface (API) for augmenting an application API. A computer system receives software code written in a second programming language indicating a user's intention to augment an application API with contracts from a contract API written in a first programming language. The software code includes a reference to the contract API. The contracts include assertions indicating appropriate use of the application API. The computer system accesses portions of the contract API according to the reference in the software code and compiles the received software code and the referenced portions of the contract API into an intermediate language (IL) version of the received software code. The IL version is in an intermediate language common to both the first programming language and the second programming language. The IL version includes the assertions indicating appropriate use of the application API.

In other embodiments, a computer system receives software code from a computer user indicating the user's intention to augment an application API with contracts from a contract API. The software code includes a reference to the contract API. The contracts include assertions indicating appropriate use of the application API. The computer system accesses portions of the contract API according to the reference in the software code, compiles the received software code and the as referenced portions of the contract API into an intermediate language version of the received software code including the one or more assertions indicating appropriate use of the application API, and provides the compiled intermediate language version of the software code to the computer user.

In other embodiments, a computer system determines that a software application has an API configured to include at least one contract written in a first programming language. The computer system receives software code written in a second programming language from a computer user indicating the user's intention to generate an executable contract for the software application using the software code written in the second programming language.

The computer system sends the software code to a managed framework component configured to receive software code written in the second programming language and output a version of the software code in a runtime language common to both the first programming language and the second programming language. The computer system receives an intermediate language version of the software code written in the second programming language and generates an executable contract for the software application based on the received intermediate language version of the software code.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical storage media and transmission media.

Physical storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry or transport desired program code means in the form of computer-executable instructions or data structures and which can be accessed by a general purpose or special purpose computer. Combinations of the above should also be included within the scope of computer-readable media.

However, it should be understood, that upon reaching various computer system components, program code means in the form of computer-executable instructions or data structures can be transferred automatically from transmission media to physical storage media. For example, computer-executable instructions or data structures received over a network or data link can be buffered in RAM within a network interface card, and then eventually transferred to computer system RAM and/or to less volatile physical storage media at a computer system. Thus, it should be understood that physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates a computer architecture 100 in which the principles of the present invention may be employed. Computer architecture 100 includes computer system 101. In some embodiments, computer system 101 includes application code 110. Application code 110 may be any type of software application code of any size or complexity, designed for any type of use. Application code 110 may be part of a software application or may, in itself, comprise a software application. Application code 110 may include any type of code written in any programming language. Code 110 may include methods, processes, linked libraries, individual lines of code or any other type of information that can be used to interact with a computer system.

In some embodiments, application code 110 also includes application programming interface (API) 111. An API may be any type of interface that allows a user or developer to access functionality of a software application. For example, application developers typically write API's to allow third party developers to write software applications that use features of the developer's application. In some cases, as will be explained in greater detail below, it may be advantageous to provide assertions in the API's contract (e.g. contract 142) indicating how the application's API is to be used. Using the information in the contract, a developer may better understand how to interact with the software application's API, and, as a result, draft higher quality, bug-free code.

Contract API 120 in computer system 101 may be configured to receive reference 113, the reference indicating that the contract API is to be used to modify or generate an API contract. For example, API 111 may include reference to contract API 112, indicating that contract API 120 is to be used to modify one of API 111's contracts. Contracts may include assertions indicating how application API 111 is to be used. Assertions may define boundaries within which application API 111 is best suited to operate. Examples of assertions include preconditions, postconditions, specific assertions, invariants, lock declarations and checked exceptions. Assertions will be explained in greater detail below.

User 105 may be any type of computer user including a software developer, a client/end-user, a system administrator or any other type of computer user. In some cases, user 105 may send application code 110 to compiler 130. Compiler 130 may be any type of software application configured to compile some portion of software code. Compiler 130 may output code in an intermediate form, in some type of intermediate language (IL), or may output executable, machine-readable code. In some embodiments, compiler 130 may be part of a managed framework, and may be referred to as a managed framework component.

As used herein, a managed framework may be a means for allowing code files written in multiple different programming languages to be reduced (or compiled) to intermediate language instructions that can be operated in a uniform manner by a managed framework (such as the Microsoft Common Language Runtime, a Java Virtual Machine, or a list processing language (LISP) interpreter). This allows for interoperability among multiple programming languages. Thus, each managed framework has languages that are compatible with that framework and languages that are not.

In some embodiments, computer system 101 may be configured to determine whether application code 110 is written in a language compatible with a given managed framework or compiler (e.g. compiler 130). Moreover, software code stored in computer system 101 and accessed by compiler 130 may be processed to determine its language compatibility. Thus, at least in some embodiments, it may be determined that application code 110 is compatible with compiler 130, regardless of whether the code was received from user 105 or was accessed in a data store on computer system 101.

Compiler 130 may be configured to process application code 110 and sends a intermediate language (IL) version of the software code 140, including API 141 and API contract 142 to tools 150. In some embodiments, tools 150 may include a variety of software tools configured to perform a variety of functions. Tools 150 may include tools for determining whether static errors exist in IL version 140, for performing correctness validations on the IL version or inserting references to runtime checks into the contract such that runtime checks can be injected into application code according to the corresponding references. Many other tools may be included in tools 150. Tools 150 may be configured to send IL version 140 with API 141 and contract 142 with runtime check references 143 to execution module 160. Execution module 160 may be any type of software method, process or application configured to execute IL version 140. Execution module 160 may output status indication 161 indicating that the execution has produced a failure or contract violation, or, alternatively, that no failures or contract violations occurred. This process will be explained in greater detail in connection with FIGS. 2 & 3.

Figure 6:
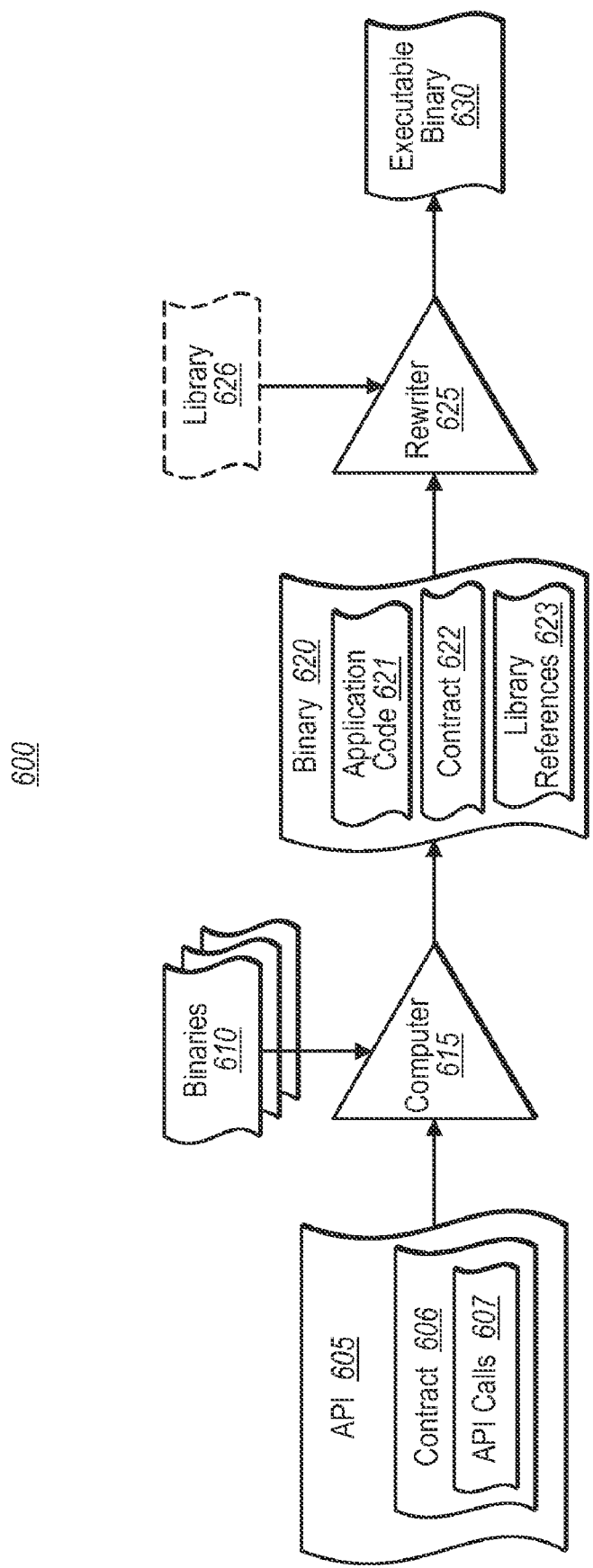
FIG. 6 illustrates an exemplary system for generating an executable binary using a contract's API.

FIG. 2 illustrates a flowchart of a method 200 for augmenting an application API. The method 200 will now be described with frequent reference to the components and data of FIGS. 1, 4 and 6.

Method 200 includes an act of receiving software code written in the second programming language indicating the user's intention to augment the application API with contracts from the contract API written in the first programming language, the software code including a reference to the contract API, the contracts including one or more assertions indicating appropriate use of the application API (act 210). For example, compiler 130 may receive application code 110 (the terms software code and application code are used synonymously herein) written in a second programming language (e.g. Visual Basic (VB), C#, etc.) indicating user 105's intention to augment application API 111 with contracts (e.g. contract 142) from contract API 120 written in a first programming language (e.g. VB, C#, etc.). Application code 110 includes reference to contract API 112, and in some cases, may communicate with or refer to contract API 120 using reference 113. Contracts (e.g. contract 142) include assertions indicating appropriate use of application API 111. Due to the general nature of contract API 120, contracts may be fully extensible to include any type of code, methods, processes, etc. Furthermore, the first programming language may be any general use programming language. Contract extensibility may allow for new methods to be added to the contract API, thus enabling new kinds of contracts to be written. Clients may be able to use such new methods written in the second programming language in the contracts.

In some cases, assertions may be used by a developer to write an application that uses that API. For example, if a third party developer wanted to write Application A and use functionality provided in Application B, the developer would use Application B's API to access Application B's functionality. In some embodiments, a contract in Application B's API may include assertions such as preconditions and postconditions that are to be satisfied when using Application B's as API. Assertions may define boundaries within which Application B is best suited to operate.

Assertions may include, but are not limited to the following: preconditions, postconditions, specific assertions, invariants, lock declarations and checked exceptions. Preconditions, as used herein, indicate requirements that the caller of the function is to satisfy. Preconditions are required to hold true upon entry to the function. Postconditions, as used herein, indicate guarantees that the implementation of a function will fulfill on completion (potentially both successful & exceptional completion). Postconditions must hold true upon exit from the function. Both preconditions and postconditions may be included as part of the declaration of a method.

Specific assertions, as used herein, are included as part of the code of a program and serve as sanity checks or clarifications in the program logic. They may also serve as a help to static verifiers. Specific assertions must be true at the appropriate point in the control flow of the program where they are included. Invariants, as used herein, indicate conditions which hold true across all operations on a type. In some embodiments, invariants are included as part of the declaration of a type and may act as assertions on data. Invariants may be temporarily invalidated during some windows of execution of the program, as long as external clients (human or programs) cannot observe any of the invalid periods. Lock declarations, as used herein, are statements used to support analysis related to behavior of the program under concurrency. Lock declarations are designed to specify which locks protect which data. Preconditions and postconditions may be used to express which locks are to be held or not held. Checked exceptions, as used herein, constrain the set of exceptions which can be thrown from a method. Checked exceptions are similar to as postconditions, but cover exceptional exits. Checked exceptions may be included as part of the declaration of a method.

In general, assertions are designed to perform a similar function: to indicate that a program is incorrect if the stated condition is not true at a specified point in execution. Thus, assertions may be used for documentation of the state or behavior of the program at a specific point, used as a computable expression which can be used to help analyze or detect errors in a program, used as a contract between distinct parts of a program (a requirement that code leading up to the assertion point must fulfill, or an assurance that code following the assertion point can rely on), or in any other of a number of uses (such as code generation via a compiler, assuming the assertions are trusted or proved correct). In some cases, assertions in a contract may be used by static program verifiers to check if the code conforms against the contract or by bug finding tools to find possible errors in the code.

Thus, application code 110 may include API 111 which may have existing contracts, or may not have any contracts. In some cases, API 141 may include multiple contracts, each capable of having multiple assertions corresponding to different methods. In some cases, API contract 142 may include one or more preconditions specifying those items that are to be satisfied before a caller is permitted to call a method. Thus, in order to use a method having such a precondition, the precondition must be satisfied before the method may be called. In other words, if the precondition is not satisfied, that method may not be called (or if the method is called, the method may fail). For example, it may be advantageous to prevent calling a method when a precondition is violated via checks performed in the build process. Furthermore, the preconditions may be evaluated at runtime as a potential backup for when a user fails to use the complete build process. In cases where a precondition is as not met, running the method may fail by throwing an exception or performing some another type of behavior (such as triggering an escalation policy).

Similarly, API contract 142 may include one or more postconditions specifying one or more guarantees that hold upon return of a method. Thus, at least in some cases, if the postcondition is not satisfied upon return of the method, the contract will no longer allow use of the API. API contract 142 may also include one or more object invariants that indicate conditions which hold true across all operations on a type. It should be noted that any of the assertions in contract 142 may be declarative. Thus, declarative assertions may describe the function of the assertion without describing each of the implementation details.

Method 200 includes an act of accessing portions of the contract API according to the reference in the software code (act 220). For example, compiler 130 may access portions of contract API 120 according to reference 112 in application code 110. Thus, in some cases, compiler 130 may use reference 112 to access portions of contract API 120 for use in compiling intermediate language version 140.

Method 200 also includes an act of compiling the received software code and the referenced portions of the contract API into an intermediate language version of the received software code, the intermediate language version being in an intermediate language common to both the first programming language and the second programming language, the intermediate language version including the one or more assertions indicating appropriate use of the application API (act 230). For example, compiler 130 may compile application code 110 and the referenced portions of contract API 120 into intermediate language version 140 of application code 10. Intermediate language version 140 may be in an intermediate language (IL) common to both the first programming language (e.g. VB, C#, etc.) and the second as programming language (e.g. VB, C#, etc.). The IL version 140 may include assertions indicating appropriate use of application API 141.

In some embodiments, for example, application code 110 may be written in Visual Basic and contract API may be written in C#, compiler 130 may be configured to output an IL version of the Visual Basic code that is compatible with the contract API 120 written in C#. In some cases, both languages may be part of a managed framework. Because, in such cases, both languages are part of a common managed framework, code written in one language may be used to modify code written in another language. This may be advantageous in situations where contract API 120 is written in a programming language unfamiliar to user 105, who nonetheless desires to modify an application API's contract, possibly by adding various assertions.

In some embodiments, computer system 101 includes tools 150 which may include a variety of different software tools. For instance, tools 150 may include a tool configured to access compiled intermediate language version 140 and insert one or more runtime check references 143 into contract 142. Runtime check references 143 may be used as placeholders to identify places in application code where runtime checks may be inserted. Such a tool may be further configured to execute IL version 140 including contract 142 with runtime check references, and determine that at least one of the assertions in contract 142 was violated during the execution of the IL version. Furthermore, based on such a determination, the tool may be configured to provide an indication that at least one of the assertions was violated (e.g. in status indication 161). In other cases, one of tools 150 may be configured to execute IL version 140 including contract 142 with inserted runtime check references, and determine that none of the assertions in contract 142 were violated during the as execution of the IL version. And, based on such a determination, the tool may be configured to provide an indication that none of the assertions were violated (e.g. in m status indication 161).

In some embodiments, tools 150 may include a tool configured to perform a static analysis on IL version 140 to determine whether the assertions of contract 142 were satisfied. In some cases, if the static analysis determines that the assertions of the contract were satisfied, the user may be notified of such (e.g. in correctness validation 151). Similarly, if one or more of the assertions failed to be satisfied, a notification (e.g. static errors 151) may be configured to include such information. In some cases, the user may simply be notified that the contract was modified.

Figure 4:
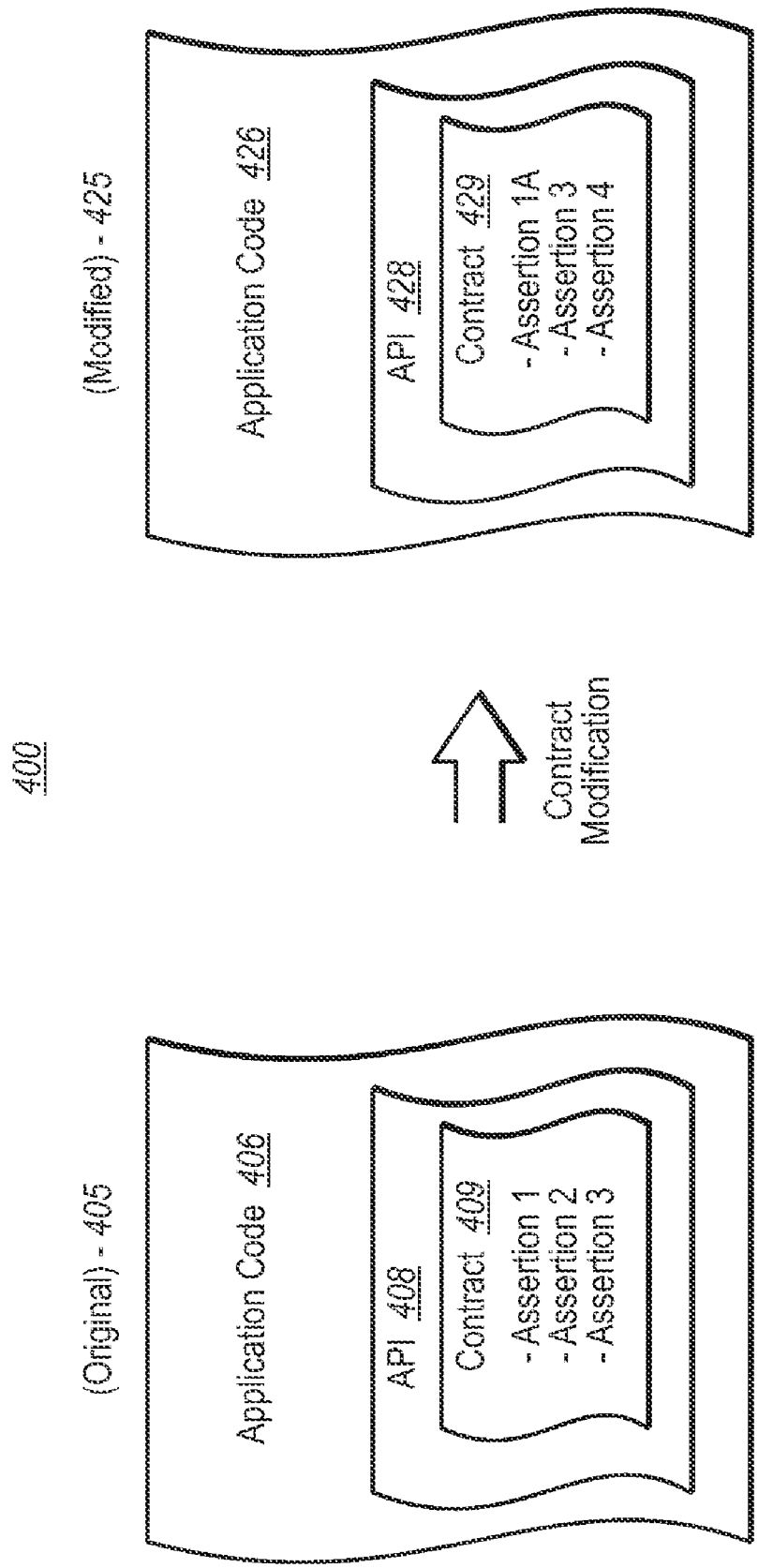
FIG. 4 illustrates an exemplary embodiment of a modified contract.

In an exemplary embodiment described in FIG. 4, a contract may be augmented with assertions in the manner described above. Application code 406 in its untouched, original form (405), includes API 408 and contract 409 with multiple assertions 1, 2 and 3, which may correspond to various assertions such as preconditions, postconditions, invariants, or other elements. User 105 may input application code 406 that, after being compiled with portions of contract API 120, is used to augment contract 409. The resultant modified version 425 of application code 426 includes API 428 and contract 429 with augmented (or new) assertions 1A, 3 & 4. Assertion TA is a modified version of original assertion 1, assertion 3 is the same, and assertion 4 has been added. Thus, contract augmentation may include altering existing assertions, removing assertions (such as element 2) and/or adding assertions to a contract.

FIG. 3 illustrates a flowchart of an alternative method 300 for augmenting an application API. The method 300 will now be described with frequent reference to the components and data of FIGS. 1, 5 and 6.

Method 300 includes an act of receiving software code from a computer user indicating the user's intention to augment an application API with contracts from a contract API, the software code including a reference to the contract API, the contracts including one or more assertions indicating appropriate use of the application API (act 310). For example, application code 110 may be received from computer user 105 indicating user 105's intention to augment application API 111 with contracts 142 from contract API 120. Application code 110 includes reference to contract API 112. Contract 142 includes one or more assertions indicating appropriate use of application API 141. As indicated above, contract 142 may include one or more preconditions specifying those items that are to be satisfied before a caller is permitted to call a method. Additionally or alternatively, contract 142 may include one or more postconditions specifying one or more guarantees that hold upon return of a method. Invariants, specific assertions, lock declarations, checked exceptions and other assertions may also be individually or collectively included in API contract 142.

Method 300 also includes an act of accessing portions of the contract API according to the reference in the software code (act 320). For example, compiler 130 may access portions of contract API 120 according to reference 112 in application code 110.

Method 300 includes an act of compiling the received software code and the referenced portions of the contract API into an intermediate language version of the received software code including the one or more assertions indicating appropriate use of the application API (act 330). For example, compiler 130 may compile application code 110 and the referenced portions of contract API 120 into IL version 140 including API 141 and contract 142 with various assertions indicating appropriate use of application API 141. In some cases, compiler 130 may be part of a managed framework configured to receive software code and output a intermediate language (IL) version of the application code 140 that is common to multiple different programming languages included in the managed framework. For example, if software code 110 is written in C# and contract 142 is written in Visual Basic, compiler 130 may be configured to output an IL version of the C# code that is compatible with the contract 142 written in Visual Basic.

Method 300 includes an act of providing the compiled intermediate language version of the software code to the computer user (act 340). For example, computer system 101 may provide compiled IL version 140 to computer user 105. In some cases, the IL version may be provided to user 105 for subsequent application to tools 150. In some cases, computer system 101 may provide IL version 140 directly to tools 150. As indicated above, many different tools may be used to perform anything from error checking (runtime or static), documentation generation, logging, or other features. Documentation, for example, may be used to inform such users how to use the contract with the application API. Such documentation may be generated automatically by tools 150.

Contract 142 may represent an augmented version of an existing contract already a part of API 111. Additionally or alternatively, contract 142 may represent a new contract generated using contract API 120. In an exemplary embodiment described in FIG. 5, contract 529 for API 528 may be generated in a manner similar to contract augmentation described above. In other words, contract generation may be equivalent to augmenting a contract that contains no information (i.e. no assertions). In this example, application code 506 in its untouched, original form (505) includes API 508. Application code 10, after being converted to an IL version, may be used to produce an application API with a generated contract (525). The resultant generated application code 526 includes API 528 and generated contract 529 with assertions 1, 2 and 3, which may correspond to various assertions such as preconditions, postconditions, invariants, or other elements. Thus, API 528 may be configured to include and use generated contract 529, including any or all of the various assertions included in the contract.

Some embodiments may include a system for generating an executable binary that includes application code, one or more contracts, library references and other elements. For example, as described in FIG. 6, compiler 615 may be configured to receive software application code including API 605 with contract 606 identifying one or more assertions 607 (some of which may be conditional) that specify how to interact with the software application code. Contract 606 is extensible an may include one or more references indicating portions of application code that are to be replaced with a value. Furthermore, contract 606 may be written in any general purpose programming language.

Compiler 615 may be configured to integrate the one or more assertions, along with any received binaries 610, into corresponding methods in the software application code. Rewriter 625 may be configured to receive compiled binary 620 binary from compiler 615, where the binary includes software application code 621, contract 622 and library references 623, and rewrite the received binary such that the portions of application code indicated by the references in the contract are replaced with values in the intermediate (runtime) language.

In some cases, the binary may be rewritten for both runtime checking as well as subsequent reading. Furthermore, this new (rewritten) binary may be used as input for compiling a new piece of software that uses the rewritten software. The rewritten binary may be output as executable binary 630. Rewriter 625 may optionally have access to one or more libraries 626 for use in rewriting. In some cases, the software code and the contract may be compiled separately and then later combined by rewriter 615. As indicated above, the assertions may include preconditions, postconditions, object invariants, lock declarations, checked exceptions, usage protocols, or any other type of assertion.

Thus, according to some embodiments, a user may be able to write software code in one language that may be used to augment a contract of an application API written in another language. The contract may include multiple assertions including preconditions and postconditions, which are to be satisfied in order to properly use the application API associated with the contract, which may lead to fewer programming errors.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a computer system, a method for adding an executable contract to a method such that when the method is called, the executable contract is also executed to ensure that the method is called according to one or more rules specified in the contract, the method comprising:
    an act of receiving source code that includes a call to a method of a first class as well as a call to a method of a contract class, the contract class providing methods for ensuring that the call to the method of the first class is performed in accordance with one or more rules specified as input to the call to the method of the contract class;

an act of compiling the received source code into intermediate language code that includes code for implementing the method of the first class as well as code for implementing the method of the contact class which is configured to be executed to verify that the one or more rules are met whenever the method of the first class is called and to report whether the one or more rules are met;

an act of storing the intermediate language code;

an act of executing the intermediate language code, wherein when the method of the first class is executed, the method of the contract class is also executed to verify whether the one or more rules are met; and an act of reporting to a user via a user interface whether the one or more rules were met during the execution of the method of the first class.

2. The method of claim 1, further comprising an act of statically checking the intermediate language code to verify whether the one or more rules are met.

3. The method of claim 1, wherein the contract class is extensible to enable new methods to be added to the contract class to enable new kinds of contracts to be written.

4. The method of claim 1, further comprising an act of automatically generating documentation for the first class based on the added contract.

5. The method of claim 1, wherein contracts written using the contract class are persisted for a plurality of downstream tools.

6. The method of claim 1, wherein the one or more rules include one or more of the following: preconditions, postconditions, lock declarations, checked exceptions, usage protocols and object invariants.

7. The method of claim 6, wherein the one or more rules comprises a pre-condition to the method of the first class, and wherein the act of executing the intermediate language code comprises executing the method of the contract class upon entering the method of the first class to verify that one or more parameters of the method of the first class meet one or more conditions specified in the pre-condition.

8. The method of claim 6, wherein the one or more rules comprises a post-condition to the method of the first class, and wherein the act of executing the intermediate language code comprises executing the method of the contract class upon exiting the method of the first class to verify that a return value of the method of the first class meet one or more conditions specified in the post-condition.

9. The method of claim 6, wherein the one or more rules comprises an object invariant, and wherein executing the intermediate language code comprises executing the method of the contract class to verify that each type of the first class meets one or more conditions specified in the object invariant.

10. The method of claim 1, wherein the contract class is written in a different programming language than the first class.

11. A computer program product comprising one or more physical storage devices having stored thereon computer executable instructions which when executed perform a method for adding an executable contract to a method such that when the method is called, the executable contract is also executed to ensure that the method is called according to one or more rules specified in the contract, the method comprising:

an act of receiving source code that includes a call to a method of a first class as well as a call to a method of a contract class, the contract class providing methods for ensuring that the call to the method of the first class is performed in accordance with one or more rules specified as input to the call to the method of the contract class;

an act of compiling the received source code into intermediate language code that includes code for implementing the method of the first class as well as code for implementing the method of the contact class which is configured to be executed to verify that the one or more rules are met whenever the method of the first class is called and to report whether the one or more rules are met; and an act of storing the intermediate language code;

an act of executing the intermediate language code, wherein when the method of the first class is executed, the method of the contract class is also executed to verify whether the one or more rules are met; and an act of reporting to a user via a user interface whether the one or more rules were met during the execution of the method of the first class.

12. A computer system, the computer system comprising:

one or more processors; and one or more computer-readable storage media storing computer-executable instructions representing a software design tool that is executed by the one or more processors to perform the following:

an act of receiving source code that includes a call to a method of a first class as well as a call to a method of a contract class, the contract class providing methods for ensuring that the call to the method of the first class is performed in accordance with one or more rules specified as input to the call to the method of the contract class;

an act of compiling the received source code into intermediate language code that includes code for implementing the method of the first class as well as code for implementing the method of the contact class which is configured to be executed to verify that the one or more rules are met whenever the method of the first class is called and to report whether the one or more rules are met;

an act of storing the intermediate language code;

an act of executing the intermediate language code, wherein when the method of the first class is executed, the method of the contract class is also executed to verify whether the one or more rules are met; and an act of reporting to a user via a user interface whether the one or more rules were met during the execution of the method of the first class.

13. The system of claim 12, wherein the contract class is written in a different programming language than the first class.

14. The system of claim 12, wherein the one or more rules are at least one of a precondition, a postcondition, a lock declaration, a checked exception, a usage protocol, and an object invariant.

* * * * *